United States Patent Office.

JOHN OTTO DONNER, OF JERSEY CITY, NEW JERSEY.

Letters Patent No. 93,865, dated August 17, 1869.

IMPROVED MODE OF TREATING BONE-BLACK FOR FILTERING SIRUPS, &c.

The Schedule referred to in these Letters Patent and making part of the same.

*To all whom it may concern:*

Be it known that I, JOHN OTTO DONNER, of Jersey City, in the county of Hudson, and State of New Jersey, have invented a new and useful Improvement in the Treatment of Animal Charcoal or Bone-Black for Decolorizing Purposes, of which the following is a full, clear, and exact description.

My improvement in the treatment of animal charcoal has for its object the augmentation of the decolorizing-property of such article or product as used for sugar-refining, distilling, and other purposes; and The invention consists in subjecting the bone-black, after it has been prepared in the ordinary, or any suitable manner, to be used as a decolorizer and purifier, to the action of chlorine-gas, or to water impregnated with said gas.

Thus I take the charcoal, after, for instance, it has passed through the ordinary process of revivification, by washing, cleaning, and carbonizing it, and placing the same in a suitable vessel or apparatus, pass through the mass chlorine-gas, which may be produced for the purpose in the ordinary or any suitable manner, or, instead of using the gas direct, water, charged or impregnated with chlorine-gas, may be run over the bone-black.

In either case, the absorbent property of the charcoal, which may be computed at seventy (70) times its own volume, causes it to take up the gas until thoroughly saturated with it, when the process is arrested, and the bone-black, having its decolorizing-power or property largely augmented, is ready for use.

The vessel or apparatus employed for the purpose of charging or saturating the bone-black with said gas may be varied. Thus it may be of a cylindrical form, open at top, and of a tapering or funnel-shape below, where it should be provided with a valve. The bone-black being put in this vessel, the gas may be introduced from any suitable generator by a pipe bent or arranged to project down within said vessel to near its bottom, so that the gas is caused, in ascending, to percolate through the charcoal till the latter becomes saturated, which may be tested by placing litmus paper on top of the charcoal, or otherwise.

The gas should then be shut off, and the valve in the bottom of the vessel opened to discharge the bone-black into any suitable receiver or truck to provide for its removal, when, on the said valve being closed again, a fresh charge of charcoal may be put into the apparatus, and the gas turned on for a repetition or continuance of the process.

What is here claimed, and desired to be secured by Letters Patent, is—

The treatment of bone-black for augmenting its decolorizing-power or property by subjecting it to the action of, or saturating it with chlorine-gas, or exposing it to water charged with said gas, substantially as specified.

JOHN OTTO DONNER.

Witnesses:
FRED. HAYNES,
HENRY PALMER.